Nov. 3, 1925.
M. T. VOIGT
TRANSMISSION APPARATUS
Filed Dec. 6, 1923
1,560,123
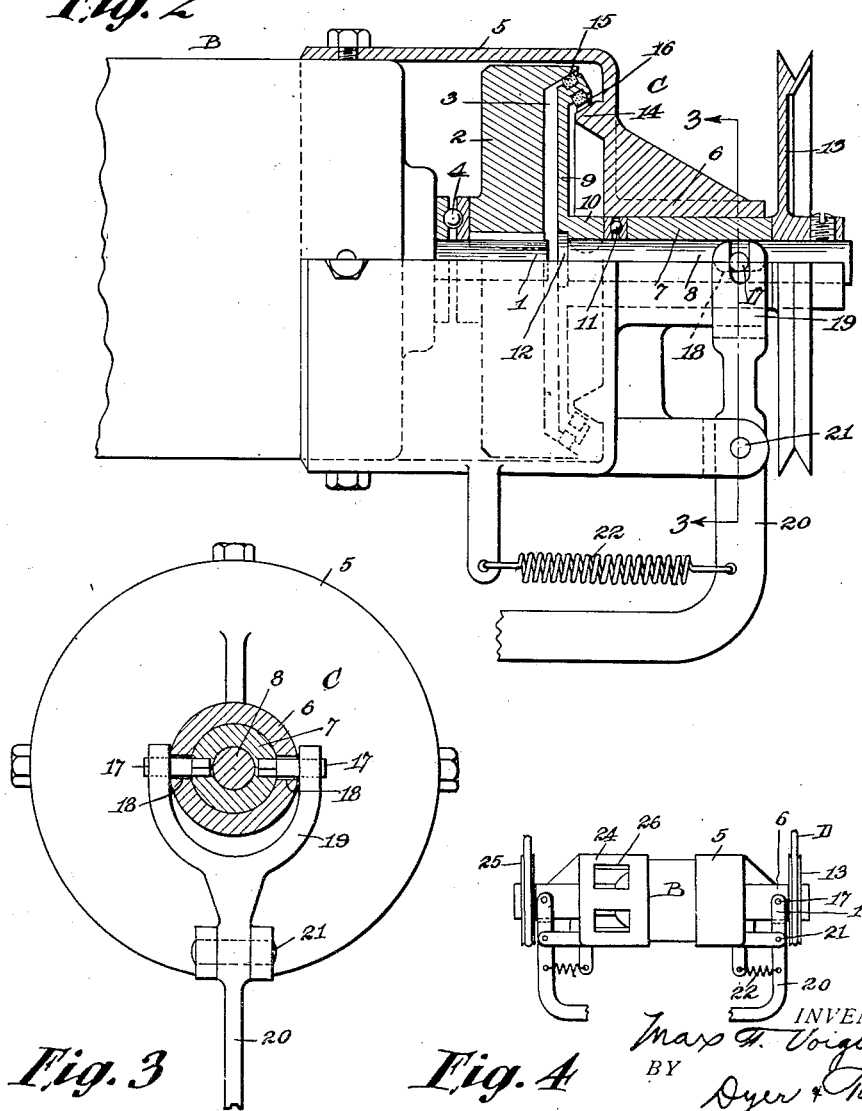

Patented Nov. 3, 1925.

1,560,123

UNITED STATES PATENT OFFICE.

MAX T. VOIGT, OF READING, PENNSYLVANIA, ASSIGNOR TO AMERICAN SAFETY TABLE CO. INC., OF NEW YORK, N. Y., A CORPORATION OF NEW YORK.

TRANSMISSION APPARATUS.

Application filed December 6, 1923. Serial No. 678,835.

*To all whom it may concern:*

Be it known that I, MAX T. VOIGT, a citizen of the United States of America, and a resident of Reading, county of Berks, and State of Pennsylvania, have invented a new and useful Transmission Apparatus, of which the following is a specification.

The invention relates to apparatus for the transmission of power from a continuously operating mechanism to a machine adapted to be operated more or less intermittently, and more particularly is designed to drive a single unit such, for example, as a sewing machine.

The objects of the invention are to produce a device of the character described which will be of cheap and rugged construction, of compact form, which will be economical of operation, which will not easily get out of order, which will be easy to repair and which will provide safety for the operator.

These and further objects will more fully appear in the following specification and accompanying drawings considered together or separately.

One embodiment of the invention is illustrated in the accompanying drawings in which like parts are designated by corresponding characters of reference, and in which—

Fig. 1 is a side elevation of a table carrying a plurality of sewing machines and individual motors with the invention applied.

Fig. 2 is a side elevation, partly in section, with the invention applied.

Fig. 3 is a transverse section taken on the line 3—3 of Fig. 2, and

Fig. 4 is a detail side elevation of a motor with a transmission applied to each end thereof.

In the drawings A designates a table below which is mounted an electric motor B which carries a transmission C, the latter being connected by a belt D to a sewing machine mounted on the table.

The end 1 of the motor shaft is extended beyond the motor housing, and has keyed thereto a flywheel 2 having a shallow conical recess 3. An anti-friction thrust bearing 4 is placed between the flywheel hub and the motor shaft bearing Secured to that end of the motor which carries the flywheel is a shell or housing 5 which encloses the flywheel and is provided with a relatively long bearing 6 in axial alinement with the motor shaft 1.

Carried in the bearing 6 is a sleeve 7, and journalled in the sleeve is a stub shaft 8. The shaft 8 extends beyond the ends of the sleeve, and keyed to the inner end of the shaft, and within the housing 5 is a brake-clutch disc 9 having a hub 10, and an anti-friction thrust bearing 11 is interposed between the hub and the inner end of the sleeve 7. The thrust bearing 11 is preferably located within the bearing 6, and the inner end of the shaft 8 is provided with a head 12 between which and the thrust bearing, the disc 9 is secured.

The outer end of the shaft 8 has secured thereto a grooved pulley 13, and the sleeve 7 and thrust bearing 11 are secured against movement longitudinally of the shaft, between the hubs of the disc 9 and of the pulley 13.

The inner side of the end of the housing 5 carries an annular flange 14 concentric with the shafts 1 and 8, and the outer periphery of the flange is conical.

The disc 9 is positioned between the flywheel 2 and the flange 14 and is provided with a rim having two engaging faces 15 and 16 adapted to cooperate with the conical wall of the flywheel and the conical face of the flange respectively.

The sleeve 7 is provided with a pair of diametrically extending pins 17, 17 which project outwardly through elongated slots 18 in the bearing 6 and are engaged by the crutch end 19 of a shifting lever 20 pivoted at 21. A spring 22 normally holds the lever in position to engage the disc face 16 with the flange 14. The lever 20 is connected to a pedal 23.

In operation when the operator presses the pedal the lever will be moved against the tension of the spring, the disc will be moved to engage its face 15 with the conical wall of the flywheel recess, the shaft 8 will be clutched to the motor shaft 1 and the sewing machine will be driven.

When the pressure is removed from the pedal the tension of the spring will disengage the disc from the flywheel and engage the face 16 of the disc with the flange 14, and the movement of the shaft 8 will be arrested.

In Fig. 4 is illustrated an arrangement in which two transmissions may be driven from one motor. In this embodiment of the invention a second housing 24 is carried on the motor at that end of the same opposite the housing 5 and a second pulley 25 is carried on a stub shaft in the housing 24, whereby two machines may be driven by the same motor.

As illustrated the housing 24 is provided with openings 26 by means of which access to the brushes and commutator of a direct current motor may be had. In use with an alternating current motor the openings may be omitted and the housing 24 and its contents will be duplicates of the housing 5.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described, what is claimed as new and desired to be secured by Letters Patent, is as follows:

1. A device of the character described, comprising a motor having a rotating shaft, a stub shaft near each end of the motor shaft and in axial alinement therewith, and means for moving the stub shafts to clutch the same to the motor shaft.

2. A device of the character described, comprising a motor having a rotating shaft, a stub shaft near each end of the motor shaft and in axial alinement therewith, and independent means for moving each stub shaft to clutch the same to the motor shaft.

3. A device of the character described, comprising a motor having a rotating shaft, a member carried by the shaft, a stub shaft in axial alinement with the motor shaft, a support for the stub shaft, an element carried by the stub shaft, means for moving the stub shaft to engage the element with the member whereby the stub shaft will rotate with the mtor shaft, and automatic means for moving the stub shaft to engage the element with the support to arrest the rotation of the stub shaft.

4. A device of the character described, comprising a motor having a rotating shaft, a clutch member carried by the said shaft, a stub shaft in axial alinement with the motor shaft, said stub shaft being supported by the motor, an element carried by the stub-shaft, a brake member carried by the support, means for moving the stub shaft to engage the element with the clutch member, and means for moving the element to disengage the same from the clutch member and to engage the brake member.

5. A device of the character described, comprising a motor having a rotating shaft, a clutch member carried by the said shaft, a stub shaft in axial alinement with the motor shaft, said stub shaft being supported by the motor, an element carried by the stub shaft, a brake member carried by the support, means for moving the stub shaft to engage the element with the clutch member, and means for automatically moving the element to disengage the same from the clutch member and to engage the brake member.

6. A device of the character described, comprising a motor having a rotating shaft, a clutch member carried on the shaft, a housing secured to the motor, a stub shaft carried by the housing in axial alinement with the motor shaft, a disc secured to one end of the stub shaft, said clutch member and disc being within the housing, and means outside the housing for moving the stub shaft axially to engage the disc with the clutch member.

7. A device of the character described, comprising a motor having a rotating shaft, a clutch member carried on the shaft, a housing secured to the motor, a stub shaft carried by the housing in axial alinement with the motor shaft, a disc secured to one end of the stub shaft, said clutch member and disc being within the housing, a brake member carried by the housing and within the same, means outside the housing for moving the stub shaft axially to engage the disc with the clutch member, and means for automatically moving the stub shaft to disengage the disc from the clutch member and to engage the same with the brake member.

8. A device of the character described comprising a motor having a rotating shaft, a flywheel secured to the shaft, there being a conical recess in the flywheel, a housing secured to the motor casing, a bearing carried by the housing in axial alinement with the shaft, a stub shaft mounted in the bearing and extending into the housing, a disc rigidly secured to the shaft and within the housing, said disc having a conical rim, there being a conical annular flange on the inner wall of the housing and in axial alinement with the flywheel and disc, there being a conical recess in the disc, said stub shaft extending outside of the housing, and means outside of the housing for moving the stub shaft in opposite directions.

9. A device of the character described, comprising a motor having a rotating shaft, a flywheel on the shaft, a thrust bearing interposed between the flywheel and the motor casing, a housing secured to the motor casing and extending axially beyond the same, a bearing carried by the housing in axial alinement with the shaft, an annual flange on the inner wall of the housing and in axial alinement with the bearing, a stub shaft carried in the bearing and extending beyond each end thereof, one end of said shaft projecting into the housing, a disc secured to the said end, and means outside of the housing for moving the stub shaft to engage the disc alternately with the flywheel and the flange.

10. A device of the character described, comprising a motor having a rotating shaft, a stationary bearing in axial alinement with the shaft, a movable bearing journalled in the stationary bearing, a stub shaft journalled in the movable bearing, a clutch member carried by the motor shaft, a brake member carried by the stationary bearing, an element carried by the stub shaft, and means for reciprocating the movable bearing to alternately engage the element with the clutch and brake members.

11. A device of the character described, comprising a motor having a rotating shaft, a stationary bearing in axial alinement with the shaft, a movable bearing journalled in the stationary bearing, a stub shaft journalled in the movable bearing, a clutch member carried by the motor shaft, a brake member carried by the stationary bearing, an element carried by the stub shaft, manually operated means for moving the movable bearing to engage the element with the clutch member, and automatic means for moving said bearing to release the element from the clutch member and to engage the same with the brake member.

12. A device of the character described, comprising a motor having a rotating shaft, a stationary bearing in axial alinement with the shaft, an axially movable bearing journalled in the stationary bearing, a stub shaft journalled in the movable bearing, means for preventing rotary movement of the movable bearing, a clutch member carried by the motor shaft, a brake member carried by the stationary bearing, an element carried by the stub shaft, manually operated means for moving the movable bearing to engage the element with the clutch member, and a spring for moving said bearing to release the element from the clutch member and to engage the same with the brake member.

13. A device of the character described, comprising an electric motor having a rotating shaft, a flywheel-clutch member carried by the shaft, a housing secured to the motor casing and surrounding the flywheel, a brake member in the housing, said member being opposed to the clutch member, a relatively long bearing on the housing in axial alinement with the motor shaft and spaced therefrom, a sleeve journalled in the bearing, a stub shaft journalled in the tube and extending into the housing, a clutch-brake element secured to the inner end of the stub shaft and positioned between the clutch and brake members, a pulley carried by the opposite end of the stub shaft, said tube being positioned on the shaft between and by the element and pulley, there being a pair of radially disposed slots in the bearing, pins carried by the sleeve and extending outwardly through the slots, and an operating lever engaging the pins.

This specification signed this 30th day of November, 1923.

MAX T. VOIGT.